US006683432B2

(12) United States Patent
Griffis

(10) Patent No.: US 6,683,432 B2
(45) Date of Patent: Jan. 27, 2004

(54) SAFETY CIRCUIT WITH AUTOMATIC RECOVERY

(75) Inventor: Michael Griffis, High Springs, FL (US)

(73) Assignee: Eigenpoint Company, High Springs, FL (US)

( * ) Notice: Subject to any disclaimer, the term of this patent is extended or adjusted under 35 U.S.C. 154(b) by 0 days.

(21) Appl. No.: 10/241,216

(22) Filed: Sep. 11, 2002

(65) Prior Publication Data

US 2003/0050735 A1 Mar. 13, 2003

Related U.S. Application Data

(60) Provisional application No. 60/322,168, filed on Sep. 12, 2001.

(51) Int. Cl.[7] ................................................ B25J 19/02
(52) U.S. Cl. ............. 318/568.16; 318/567; 318/568.12; 318/569; 318/600; 340/500; 340/541
(58) Field of Search ................................. 318/563, 565, 318/567, 568.12, 568.16, 568.23, 569, 600; 340/500, 532, 522, 539.2, 541, 679

(56) References Cited

U.S. PATENT DOCUMENTS

| | | | |
|---|---|---|---|
| 4,263,647 A | | 4/1981 | Merrell |
| 4,401,976 A | * | 8/1983 | Stadelmayr ................. 340/522 |
| 4,437,089 A | | 3/1984 | Achard |
| 4,481,449 A | | 11/1984 | Rodal |
| 4,616,216 A | | 10/1986 | Meirow et al. |
| 4,772,875 A | * | 9/1988 | Maddox et al. ............. 340/522 |
| 4,818,866 A | | 4/1989 | Weber |
| 4,857,912 A | * | 8/1989 | Everett et al. .............. 340/508 |
| 4,898,263 A | | 2/1990 | Manske et al. |
| 4,912,384 A | | 3/1990 | Kinoshita et al. |
| 5,218,196 A | | 6/1993 | Dogul et al. |
| 5,263,570 A | | 11/1993 | Stonemark |
| 5,278,454 A | | 1/1994 | Strauss et al. |
| 5,280,622 A | | 1/1994 | Tino |
| 5,319,306 A | | 6/1994 | Schuyler |
| 5,407,028 A | | 4/1995 | Jamieson et al. |
| 5,408,089 A | | 4/1995 | Bruno et al. |
| 5,426,355 A | | 6/1995 | Zweighaft |
| 5,451,879 A | | 9/1995 | Moore |
| 5,473,368 A | * | 12/1995 | Hart .......................... 348/155 |

(List continued on next page.)

*Primary Examiner*—Rina I. Duda
(74) *Attorney, Agent, or Firm*—Christine Q, McLeod of Beusse Brownlee Wolter Mora & Maire

(57) ABSTRACT

A safety circuit is described that monitors a number of sensors for intrusion of objects or people into the workspace of a robot and controls the drive power to the motion control system via an emergency-stop circuit. The system monitors the motion control system and models it as just another sensor to ensure that it is working properly. In the event that there is intrusion, the safety circuit assigns a degree of intrusion (e.g., precautionary or serious). For serious intrusions, the safety circuit kills drive power thereby preventing additional motion of the robot. Killing drive power (de-energizing the emergency-stop circuit) requires a qualified operator to restart for further operation. For precautionary intrusions, the safety circuit takes control of the motion control system by disabling the power stages of motion control amplifiers but retaining drive power there. This inhibits further motion. The safety circuit keeps the amplifiers inhibited for a period to permit the intrusion time to clear. In the event that the intrusion clears quickly, the safety circuit releases control of the power stage to permit continued operation (automatic recovery). This can reduce the occurrences of nuisance trips of the emergency-stop circuit. Various means in the architecture are described here to ensure and verify that the system is safe. This is advantageous because scrutiny of the approach can be focused on the limited functionality (software, hardware) of the safety circuit. Highly complex functionality (software, hardware) of the motion control system can be safely modeled as potentially unsafe, thereby requiring far less scrutiny.

28 Claims, 4 Drawing Sheets

U.S. PATENT DOCUMENTS

| | | | |
|---|---|---|---|
| 5,576,972 A | * 11/1996 | Harrison | .................... 702/128 |
| 5,880,954 A | 3/1999 | Thomson et al. | |
| 6,173,814 B1 | 1/2001 | Herkel et al. | |
| 6,215,204 B1 | 4/2001 | Brown et al. | |
| 6,246,318 B1 | 6/2001 | Veil et al. | |
| 6,246,928 B1 | 6/2001 | Louis et al. | |
| 6,388,563 B1 | 5/2002 | Brown et al. | |
| 6,392,318 B1 | 5/2002 | Griffis | |

* cited by examiner

SAFETY CIRCUIT WITH AUTOMATIC RECOVERY

This application claims the benefit of U.S. patent application Ser. No. 60/322,168 filed on Sep. 12, 2001, incorporated herein by reference.

FIELD OF THE INVENTION

The present invention relates to a safety circuit that monitors a number of sensors for intrusion of objects or people into the workspace of a robot and controls the drive power to the motion control system via an emergency-stop circuit.

BACKGROUND OF THE INVENTION

Safety switches or safety sensors serve for shutting off drive power to machinery when people or objects enter a designated work place zone. Typically, a safety switch is connected to the door or opening that provides access to the work place zone. The safety switch is typically tripped when the door is opened, shutting off drive power to the machinery. Devices of this type are used to prevent people or objects from entering the work place zone while the machine is in operation, decreasing the potential for injury and/or damage to the machinery. Other non-tactile-type intrusion sensors are infrared or ultrasonic, whose sensing zone could be a light curtain or fence, or it could be a quadrant or cone. Typically, drive power to machinery is removed when intrusion is detected, which requires a skilled operator to restart the machinery. Frequently occurring nuisance trips can defeat the advantages of having an automatic machine doing unattended or mundane tasks such as automated refueling for automobiles, because the store attendant is forced to frequently come outside to restart drive power. (It is generally accepted that a consumer is not qualified to restart drive power.)

In an industrial controls environment, presence sensing device initiation (PSDI) is a mode of operation where an intrusion sensor acts as a safeguarding device, but it is also used in a control configuration such that intrusions are monitored so that the "control starts a robot cycle when the sensing field is clear without the need of pressing any additional cycle enable or run buttons" (ANSI/RIA R15.06/ 1999). This is used to safeguard an operator who is feeding parts to a robot for processing. It is a mode of operation used to start motion for an imminent robot cycle. So far, it lacks sufficient details for implementation, specifically regarding inhibiting motion during the operator's intrusion.

There are a number of patents in this field including U.S. Pat. Nos. 4,263,647; 5,451,879; 4,616,216; 5,263,570; 4,912,384; 5,319,306; 5,278,454; 5,426,355; 4,481,449; 5,880,954; 4,818,866; 4,898,263; 5,280,622; 6,173,814; 4,437,089; 5,218,196; 5,408,089, all of which are incorporated herein by reference. Also incorporated herein by reference is U.S. Pat. No. 6,392,318 entitled "Programmable Emergency-Stop Circuit."

All references cited herein are incorporated by reference in their entirety, to the extent not inconsistent with the explicit teachings set forth herein.

BRIEF SUMMARY OF THE INVENTION

The safety circuit of the subject invention provides a means for monitoring a number of sensors for intrusion of objects or people into the workspace of a robot, monitors the motion control system, and controls the drive power to the motion control system via an emergency-stop circuit. The safety circuit navigates between permitting the machine to move, inhibiting it for Level 2 Intrusions (precautionary type), and killing drive power for Level 1 Intrusions (serious type). Such navigation establishes a methodology for automated recovery from precautionary situations.

Now, there is a need for a machine to remove drive power when an intrusion incident becomes serious but to automatically recover from cleared precautionary intrusion incidents without requiring a skilled operator's deliberate action. There is a need to provide a framework for implementing this functionality.

At a minimum, such a machine consists of an emergency-stop circuit, at least one intrusion sensor, a safety circuit, and a motion control system that is responsible for effecting the motion to carry out the machine's function. When necessary to avoid the most hazardous situation, the safety circuit kills drive power by utilizing a control signal to the emergency-stop circuit, which in turn stops the flow of bulk power to the motion control system. The emergency-stop circuit also possesses a second, independent interface to start and stop this flow of bulk power.

Accordingly, it is the first object of the invention for the safety circuit take over parts of the motion control system from time to time with the purpose of stopping and disabling motion for each axis but permitting bulk power to remain flowing (HALT state), where the safety circuit subsequently releases control back to the motion control system sometime thereafter (ACTIVE state) so that productivity may resume.

To make further use of this, it is the second object of the invention to provide the safety circuit with at least one intrusion sensor, such that from the sum of all intrusion sensors, the safety circuit can determine the severity of a single or multiple intrusion incidents, where it decides whether the intrusion is severe or precautionary. Here, the safety circuit continues scrutiny for a precautionary intrusion incident in case it becomes severe.

To make further use of this, it is the third object of the invention for the safety circuit when in an ACTIVE state to take over when an intrusion incident occurs so that all axes are stopped (HALT state), to remain in the HALT state if any incident is precautionary but no incident is severe, to kill drive power when an incident is severe (KILLED state), and to release control back to the motion control system if all incidents clear thereby enabling automatic recovery (ACTIVE state). It is the further object of the invention for the safety circuit after entering the KILLED state to remain in the KILLED state until drive power is restarted (ACTIVE state) and while in the KILLED state to force drive power off when an intrusion is sensed and to not force drive power off after all intrusions have cleared. It is the further object of the invention for the safety circuit to enter a KILLED state when drive power is lost as sensed by the safety circuit (e.g. emergency-stop button utilized) or prior to the $1^{st}$ energizing cycle after logic is first powered.

It is the fourth object of the present invention for the safety circuit to emit a visual and/or audible signal when in the HALT state to alert an intruder that productivity is halted.

It is the fifth object of the present invention to model the motion control system as a sensor in order to detect continuously that proper motion control is being conducted. Here, the complex motion control system is considered "potentially unsafe", but the safety circuit's subsequent monitoring renders the overall system "safe". When properly operating, the "sensor" reports status to demonstrate that the motion control system can definitely control, move, stop, disable, enable each axis of the machine and also definitely handle the case when an axis has a "motion control fault" (e.g. disabling feedback that stops motion when an axis exceeds an error limit or a limit switch trips due to accidental, controlled movement passed a positional limit).

It is the sixth object of the invention for the safety circuit to declare a "safety circuit fault" when uncertain of the proper operation of the motion control system or any other sensor such that a hazardous situation may exist. The safety circuit kills drive power and enters the ERROR state. While in the ERROR state, it continues to force drive power off, and it remains in the ERROR state until the fault is logged and corrected, if necessary, at which time it returns to the KILLED state.

When motion control system does have full control of the axes (ACTIVE state), a first scenario for risk assessment is in effect, which considers a person is safely outside the workspace of the machine but further considers he may enter the workspace at any time. During this time, normal machine movements and processing are carried out. Here, the assessment considers it hazardous when the safety circuit senses an uncertainty in the location, velocity, or force of an axis (e.g. bad sensor), does not get data or gets corrupt or incoherent data from the motion control system, or senses that the motion control system does not see or cannot handle a motion control fault (e.g. fails to stop an out-of-control axis). These are hazardous situations, established based on application criteria, and each is a safety circuit fault, because it is not certain that the safety circuit can take over to disable motion and safely stop all axes in the event that person does eventually enter the workspace.

When the motion control system itself recognizes, based on application established thresholds, a loss in its ability to reliably control motion, it declares a severe motion control fault and requests the safety circuit to remove or kill drive power. Accordingly, it is the seventh object of the present invention to enable the motion control system to explicitly tell the safety circuit either to kill drive power (KILL motion control state) or that the motion control system is ready (READY motion control state).

When the safety circuit does take over during a precautionary intrusion (HALT state), a second scenario for risk assessment considers that the person has just entered the workspace of the machine but is not in immediate danger. In this case, assessment considers it additionally hazardous when any sensory data from the motion control system shows continued motion or a potential for additional motion, such as positional data showing continued movement. Exceeding an application established threshold for any of these is a safety circuit fault.

Additionally, certain handshaking between the motion control system and the safety circuit improves overall safety. Accordingly, it is the eighth object of the present invention for the for the motion control system to acknowledge explicitly a take over by the safety circuit (HALT ACK motion control state) and to acknowledge regaining control (READY motion control state). A failure of the motion control system to do either constitutes a safety circuit fault, unless a KILL request is made.

It is the ninth object of the invention for the safety circuit to periodically test a sensor to ensure proper operation of the sensor. The safety circuit conducts a test of the motion control system by simulating a precautionary intrusion. The motion control system passes the test after: (i) it is determined all axes are stopped after the safety circuit takes over and (ii) subsequently when the motion control system properly regains control.

It is the tenth object of the invention to provide further handshaking between the motion control system and the safety circuit in order to ensure their synchronization and provide the motion control system a state to reinitialize. Accordingly, the motion control system explicitly communicates READY or NOT READY to the safety circuit, and the safety circuit accommodates by navigating between ACTIVE and DISABLED states, respectively, where all other changes of state criteria have priority. Additionally, a requirement for a READY motion control state is satisfied with a NOT READY motion control state, where the safety circuit navigates to the DISABLED state instead of the ACTIVE state. When in the DISABLED state, since the motion control system is not ready to servo, the safety circuit declares a safety circuit fault whenever sensory data from the motion control system shows motion or a potential for motion, such as an enabled servo amplifier. It is further the object that the safety circuit when in the KILLED state additionally forces drive power off until the motion control system reports a NOT READY motion control state so that it is certain the motion control system has seen the loss of drive power condition before drive power can be restarted.

It is the eleventh object of the invention for the resulting system to be used as an automatic refueling system for automobiles.

DETAILED DISCLOSURE OF THE INVENTION

Figure 1:
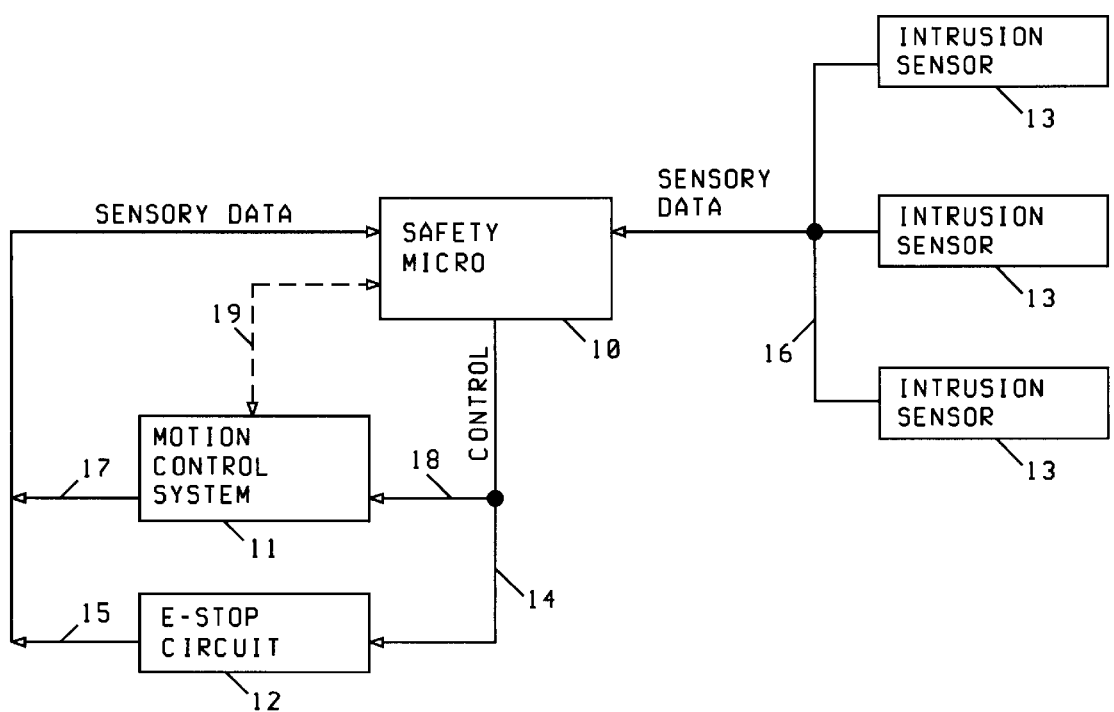
FIG. 1 depicts a schematic diagram of the safety circuit of the subject invention.

The safety circuit of the subject invention provides a means for monitoring a number of sensors for intrusion of objects or people into the workspace of a robot, monitors the motion control system, and controls the drive power to the motion control system via an emergency-stop circuit. Initially, detailed description of FIG. 1 is provided, and this is followed by a discussion of how the safety circuit navigates between permitting the machine to move, inhibiting it for Level 2 Intrusions (precautionary type), and killing drive power for Level 1 Intrusions (serious type). Intrusions have been qualified according to the concept of levels, thereby creating a framework that determines appropriate response, viz. whether and how it may recover.

FIG. 1 is a simplified schematic given from the safety circuit perspective, where the "safety micro" 10 carries out the safety circuit function. One skilled in the art will understand the components in this figure and further understand that multiple, redundant, and reciprocally communicating "safety micros" are typically employed in order to achieve sufficiently reliable control. Such a designer can easily adapt the novel aspects identified here to the more involved typical situation.

In FIG. 1, the term "motion control system" 11 is used in a general way to represent all of the hardware and software components (exclusive of the emergency-stop circuit) that perform motion control. For example, this includes the actual motion controller, a PC, servomotor amplifiers, servomotors, all process-related software, and the like. The approach here is to treat the motion control system like it is a sensor. And, therefore just as any other sensor, the motion control system is assumed to be unreliable, requiring constant monitoring and periodic checking to ensure proper operation. Also in FIG. 1, the emergency-stop circuit (e-stop circuit 12) controls the flow of bulk power to the servo amplifiers and motors, has an operator's interface to stop and start the flow (not shown), and finally has control 14 and status 15 signals that interface independently with each safety micro which enables each safety micro to stop the flow (if necessary) and determine e-stop circuit status (energized or de-energized). Each intrusion sensor 13 has control (not shown) and status signals 16 that interface to a dedicated safety micro, which enables the safety micro to initiate a test and to determine a sensory value.

The sensory input data 17 from the motion controller can be provided over a bi-directional serial data link 19 to the safety micro, e.g.:

1) watchdog input status from the motion controller (and PC), e.g. a timestamp;
2) servomotor positions, commanded velocities, and command torque values from the motion controller, with associated timestamp;
3) servomotor hall sensor states (or redundant encoder position data) for redundant position data, with associated timestamp;
4) amplifier control signal states; and
5) motion controller state (feedback on state, motion controller faults, etc.).
6) data integrity check, a cyclic redundancy check (CRC).

Alternatively, or to some extent, the safety circuit could connect directly, in-parallel to the various components, e.g. encoders, servo amplifiers, thereby in the extreme obviating the need for the communications link. However, this multiplies all wiring by two, which is not practical.

For the link, a multitude of infinities exist for how the designer can specify the protocol for packeting this data for such a transfer. The following Table 1 represents the preferred method, a stream of bytes flowing from the motion controller to the safety micro. Note that some data may be omitted based on a given application or a given design. Also, some data may not be required every packet or for every axis (see<axis data mask>). The required level of safety for an application will dictate what data is required.

TABLE 1

Packet from motion controller to safety micro.

| Data | Axis Data | Description (example) |
| --- | --- | --- |
| <destination address> | | 1 byte for safety circuit address |
| <source address> | | 1 byte for motion controller address |
| <overall length> | | 2 bytes corresponding to number of bytes of data to follow, excluding CRC |
| <overall motion controller state> | | 1 byte corresponding to: NOT-READY READY HALT-ACK KILL |
| <overall timestamp> | | 2 bytes from local motion controller system time or a simple counter |

TABLE 1-continued

Packet from motion controller to safety micro.

| Data | Axis Data | Description (example) |
| --- | --- | --- |
| | | incremented each use |
| <number of axes> | | 1 byte for number of axis data sub-packets |
| <axis sub-packet begin> | <axis identifier> | 1 byte |
| | <axis data mask> | 2 bytes describing what follows for this axis (bit-wise OR): 1: primary axis data actual position with timestamp 2: primary axis data includes commanded position 4: primary axis data includes commanded velocity 8: primary axis data includes commanded torque 16: redundant axis data actual position with timestamp 32: amplifier state (fault and enable) 64: amplifier current sense 128: limit-switch-home-state data 256: axis state |
| | <primary axis data> | containing: raw actual position data (8 bytes) commanded position (8 bytes) commanded velocity (8 bytes) command torque (2 bytes) timestamp (2 bytes) corresponding with above data |
| | <redundant axis data> | containing: raw redundant actual position data (8 bytes) timestamp (2 bytes) corresponding with above data |
| | <amplifier state> | 1 byte containing: current amplifier fault status current amplifier enable status |
| | <amplifier current sense> | 2 bytes for current sense (proportional to actual torque) |
| | <limit-switch-home-state> | 1 byte for limit switches and home state (4 bits for limit switches, 1 bit for whether axis has been homed) |
| <axis sub-packet end> | <axis state> | 1 byte corresponding to state motion controller has for this axis (e.g.): FEEDBACK_OFF FEEDBACK_ON MOVING STOPPING HOMING TESTING JOYSTICK_ON Repeat for remaining axes |
| <CRC> | | 2 bytes for cyclic redundancy check |

Particularly, the safety micro monitors the above data to determine whether a properly functioning system exists, e.g. that communication comes and that the redundant position sensors for a given servomotor are compatible (within an acceptable differences). Actual velocity is calculated by the safety micro from the sequence of position data. Also, position, velocity and torque commands and actual values can be monitored, ensuring they are within proper bounds. After the axis is homed, limit switch values can be monitored with respect to minimum and maximum positions, ensuring all are compatible, where each switch trips when it should. Finally, actual and command positions and velocities can be compared, ensuring position and velocity errors are within prescribed bounds. Note: to do this, the safety circuit requires beforehand certain 'setup data' for each axis, like maximum position error, velocity and torque, minimum and maximum positions.

Several features and options exist to guard against certain single failures in the generation and transmission of the above data. First of all, redundant position sensors exist for each axis or servomotor to accommodate a position sensor failure. Each position data maintains a timestamp to make sure that the motion controller is not merely re-sending old data. The data assembled into a packet is typically raw unprocessed data, which makes it unlikely that unintended corruption occurs due to software bugs related to processing the data. (However, in the event that the redundant position sensor is not collocated [e.g. a linkage exists between the sensors], some processing might be required in order to facilitate comparison between the sensors. Conceivably, this could be done in the safety circuit.)

Each safety micro checks for temporal consistency among the positional data and the associated timestamps and continuously compares them with their redundant counterparts. This protects against wild memory corruption within the motion controller's computer, which could result from the use of a bad pointer. A cyclic redundancy check can be used to ensure that data is not corrupted en-route from the motion controller to the safety micro.

The preferred approach described here does funnel two position sensors for a given axis or servomotor through a single motion controller computer in a manner deemed sufficiently safe. Further options exist for the most scrutinizing applications that avoid this funneling but remain within the purview of the present invention. For example, the packet in Table 1 can be split into two packets in order to further guard against memory errors internal to the motion controller. Secondly, redundant position data can be obtained by each safety micro from a second, independent source, e.g. directly from the servo amplifier (hall sensors) or from another source within the motion control system that is capable of generating a packet. Additionally, the safety micro can interface directly to the amplifiers, retrieving fault status and current sensing signals.

The packet in the reverse direction, going from the safety micro to the motion controller, may contain data corresponding to the state of the safety circuit and a request for data in the event the above packets are sent per request instead of automatically at prescribed intervals. (See Table 2.) As typical, a dedicated destination address can be used as a broadcast address, so that the safety circuit can broadcast to a multitude of motion controllers that drive power is killed, etc.

TABLE 2

Data packet from safety micro to motion controller

| Data | Description |
| --- | --- |
| <destination address> | 1 byte (e.g. 255 is broadcast) |
| <source address> | 1 byte (safety micro address) |
| <overall length> | 2 bytes corresponding to number of bytes of data to follow, excluding CRC |
| <overall timestamp> | 2 bytes corresponding with system clock on safety micro or a simple counter incremented each use |
| <safety circuit state> | 1 byte corresponding to current state: KILLED ERROR DISABLED ACTIVE HALT |
| <source> | 1 byte for (address of) source causing current state |
| <data request> | 1 byte: SEND PACKET NO PACKET |
| <CRC> | 2 bytes for cyclic redundancy check |

One of the key features of the invention is the ability of the safety circuit to "take over" control of the servomotor amplifiers, which can be verified for the most reliability. The verification for reliability is done periodically and is referred to as a "take-over test".

Figure 2:
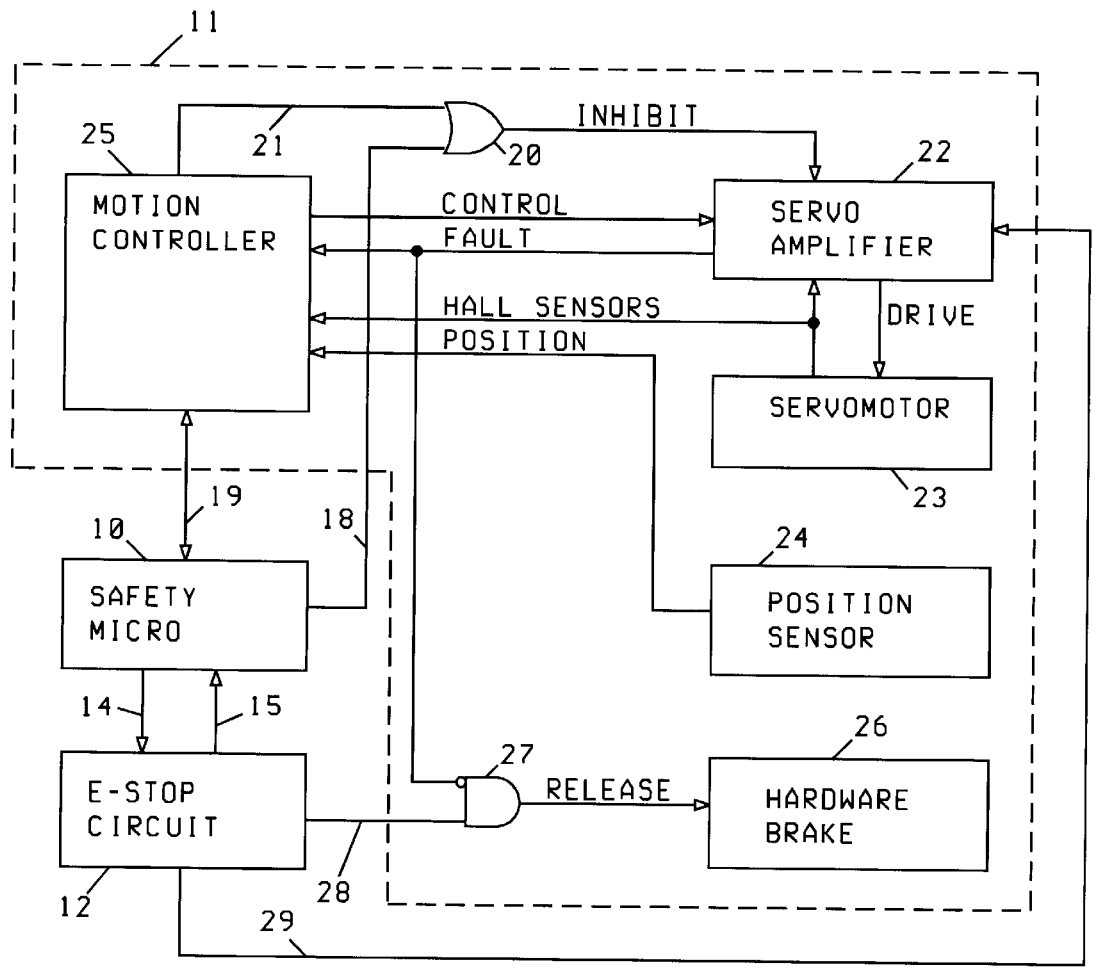
FIG. 2 depicts a schematic diagram of the motion control system connections.

The safety micro takes over control by disabling the servomotor amplifiers employing a connection 18 to the servomotor amplifier inhibit that is in-parallel with the motion controller's similar connection. (In other words, either inhibit signal coming from the safety micro or the motion controller can inhibit the servomotor amplifier.) FIG. 2 illustrates this by showing inside the motion control system 11 how the connection 18 logically combines with the motion controller's connection 21 to create the INHIBIT signal that inhibits the servo amplifier 22. Note that in practice, the inhibit connection at the servo amplifier has a pull-up resistor on input, which means open collector outputs 21 and 18 can simply be hardwired there, making the OR gate 20 unnecessary.

FIG. 2 also illustrates further typical connections, such as the HALL SENSORS and DRIVE signals between the servo amplifier 22 and the servomotor 23. The HALL SENSORS, which are used for commutation, are shown as redundant position feedback to the motion controller 25. It is redundant to the primary output of the position sensor 24. Also shown is CONTROL signal from the motion controller to the servo amplifier that is typically an analog command voltage representative of the desired current to the servomotor. The servo amplifier outputs a FAULT signal when for any reason the output drive stages are not active. This is monitored by the motion controller and can be used as a control to release the hardware brake 26. The AND gate 27 is functionally equivalent to an actual circuit that releases the hardware brake (RELEASE is active) when the e-stop circuit 12 is energized and there is no fault in the servo amplifier (inverting input of FAULT at 27). The additional outputs shown from the e-stop circuit 28 and 29 represent bulk power that power the hardware brake and servo amplifier, respectively.

Now, the in-parallel connection 18 from the safety micro to the servomotor amplifier is thought of here as the "electronic brake", and the condition when used is referred to here as the "HALT" condition. Copley of Westwood, Mass., a company selling motion control products, actually markets a servomotor amplifier (Model 5121) that possesses a 'BRAKE' input, which is handy for the present invention since it obviates the need for the in-parallel connection and provides a current-controlled stop when used.

Acknowledgment of the HALT condition is provided by the motion controller, which aborts whatever motion was proceeding and reports status to the safety micro. The safety circuit has various ways of making sure the motion controller recognizes the HALT, by monitoring commanded velocity and torque (should go to zero), motion controller's amplifier state (should be inhibited), motion controller's state (should go to HALT-ACK), and motion controller's axis state (should go to FEEDBACK_OFF). An automated recovery sequence may then commence, wherein the safety micro releases control and the motion controller regains it. Throughout the duration of the HALT condition, the emergency-stop circuit is energized, and drive power is retained to the servomotor amplifiers.

Alternatively, the take over command can be packeted and communicated over the bi-directional communications link 19. The safety micro can disable the servo amplifiers by using the safety-micro-to-motion-controller packet in Table 2 by specifying an "HALT" safety circuit state where the motion controller has been pre-configured to respond by disabling the servo amplifiers on behalf of the safety circuit.

The utilization of the capability of the safety micro to reliably take over control is a key feature of the safety circuit proposed here. Specifically, automatic recovery is proposed for certain intrusion incidents as they clear. This pertains only to Level 2 Intrusions (precautionary). Once a particular intrusion incident is sustained it becomes a Level 1 Intrusion (serious), which requires the safety circuit to kill drive power.

In practice, a study should be conducted for a given application, a given system and a given set of intrusion sensors in order to establish criteria for quantifying whether a given intrusion incident is classified as a Level 1 Intrusion or a Level 2 Intrusion. A qualitative example criteria set is provided in Table 3.

TABLE 3

Qualitative examples establishing differences between Level 1 and Level 2 incidents

| Level 2 Intrusion (precautionary) | Level 1 Intrusion (serious) |
| --- | --- |
| Momentary (e.g. less than half-second) | Sustained (e.g. more than a few seconds) |
| Object identified in peripheral area | Object identified close to robot |
| Occurs in home position (idle robot) | Occurs in another process state (e.g. while moving) |

Figure 3:
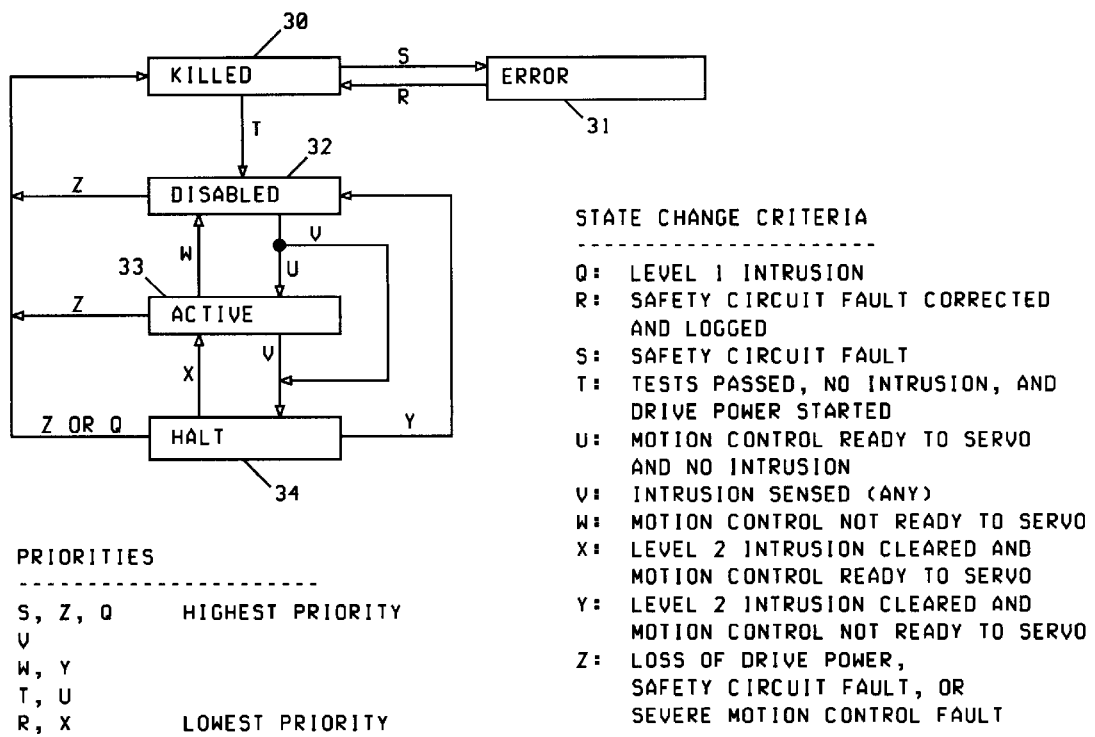
FIG. 3 depicts a schematic diagram of the safety circuit state machine of the subject invention.

A comprehensive design for how the safety circuit functions has been developed. This design is best explained by describing the safety circuit state machine shown in FIG. 3. The state machine approach to safety circuit design is a good method for describing how the safety circuit functions and for establishing a solid foundation for its implementation. Specifically, the state machine describes what can or cannot be done while in a given state and describes what a next state is for a given set of sensor data. In practice, the state machine runs as a software component on the safety micro.

Consider that the safety circuit begins in the KILLED state 30, during which drive power is forced-off (not active) when there is an intrusion. It stays in this state until such time that either a safety circuit fault is detected (S, then the state changes to ERROR 31) or until all tests have passed, there are no intrusions, and drive power is started (T, then it goes to DISABLED 32). This is determined when either condition S or T is true, where S has priority.

Generally, a "safety circuit fault" is a failure or suspected failure of some component within any part of the system. The failure could be electronic or mechanical hardware, or it could be software or communications link. In any event, the safety circuit must sense the failure and place the system into a known safe state, where the motors are all stopped. According to RIA 15.06/1999, "a control reliable safety circuit shall be designed, constructed, and applied such that any single component failure shall not prevent the stopping action of the robot." Here, response to a safety circuit fault is to enter the ERROR state and immediately kill drive power, keeping it off while in the ERROR state.

Once drive power is killed or commanded to be killed as a result of a safety circuit fault, the subsequent response and assessment of safety is application specific and typically a design issue. For example, typical inquiries relate to situations where drive power is not removed quickly enough or whether the machine does not completely stop within a safe enough distance after drive power is removed. Latency between the safety circuit determining there is a safety circuit fault and the subsequent killing of drive power is also a design issue.

What remains here is to ensure that any single component failure can be discovered by the safety circuit. Typically, this is satisfied with redundancy, diversity, and periodic testing. For example, consider two safety micros, each of differing technology, and each connected to a sensor monitoring the same zone, each of differing technology, say one is ultrasonic and the other is passive infrared. (For example, see FIG. 4.) Each safety micro can continuously sense the zone and compare results, declaring an intrusion incident when either or both senses an object. However, suppose that at some point one sensor fails, e.g. ultrasonic, unknown to its safety micro. This is a latent failure, and it can cause a hazardous situation when environmental conditions exist that adversely affect the other good sensor, e.g. a black-panted intruder not seen by the infrared sensor. In order to safely handle this scenario, periodic checking of each sensor channel is conducted, but never both simultaneously. This can be done either at prescribed intervals or before each "cycle", where cycle is defined by the application. To be sure the sensor works properly, deliberate tripping must be done. For example, a mechanical flap can enter the sensor zone. This discovers the safety circuit fault where mud covers the ultrasonic sensor deadening it so it does not sense the flap. Failing such a test is a safety circuit fault. In this way, no latent failures exist at the next demand upon the safety function.

Now, it is the concept here to treat the motion control system like it is a sensor, where this "sensor" senses (responds and stays in sync with) the state of the safety micro and senses reliably the position and behavior of at least one axis of a machine. As such, the objective of this sensor is not to sense intrusion but rather to detect that proper motion control is being conducted.

One must ponder what single failures can occur inside the motion controller and the motion control system, including what is necessary to generate and deliver the packet detailed in Table 1. Safeguards are in place to account for these (see above). It is believed that the safety circuit disclosed here reveals any conceivable single component failure within the motion control system. Such a failure, a safety circuit fault, is discovered when any of the following occurs:

A: No data, corrupt or incoherent data, e.g.:
(1) safety circuit does not receive packets, timestamps are erroneous, or CRC fail
(2) axis state not in sync with amplifier state or motion control state (e.g. packet says feedback is off, but amplifier is enabled or packet says feedback is on, but motion controller is 'NOT READY') B: An uncertainty in location, velocity, or force of an axis (suspected bad component), e.g.:
(1) discrepancy between primary and redundant position sensors,
(2) maximum actual velocity exceeded
(3) maximum current sense exceeded (proportional to actual torque)
(4) limit switches not in sync with positions after axis is homed (e.g. one does not trip when it should)
(5) motion controller state not in sync with safety circuit (e.g HALT-ACK state is stuck)
(6) motion control system not in sync with self (apparent motion when feedback is off for a given axis)
C: Failure of the motion control system to see or handle a motion control fault, e.g.:
(1) maximum commanded or actual velocity exceeded, sustained
(2) discrepancy between commanded or actual velocities, sustained
(3) maximum commanded torque exceeded, sustained
(4) maximum position error exceeded, sustained
(5) no apparent response to amplifier fault
(6) minimum or maximum position exceeded, sustained
(7) no response to limit switch trip when motion control state is not TESTING and not HOMING
D: Failure of the motion control system to acknowledge a take over, failure to stop an axis, or an apparent potential for continued motion when in the HALT or DISABLED states, e.g.:
(1) axis did not stop or it was not determined to have stopped when safety circuit took over motion control system during a Level 2 Intrusion incident (e.g. actual velocity was non-zero, discrepancy was found between redundant and primary position sensors, limit switches not in sync with positions, or motion controller failed to acknowledge the incident with incompatible state or axis state, non-zero commanded velocity or torque)

Note that the above is not an exhaustive set. Also, as it is seen from (D1), a failure to stop during the HALT or DISABLED states constitutes a safety circuit fault, where drive power is subsequently killed and motion is thus stopped.

Now, certain applications require 'testing' to determine if there is a latent failure in the ability of the safety circuit to take over control and achieve the powered stop during an Level 2 incident (HALT). Thus, the take-over test so described is for the motion control system the same as the mechanical flap test is for the ultrasonic sensor. This completes the analogy of using the motion control system as a sensor.

Recovery (condition R in FIG. 3) from a safety circuit fault depends on the source of the fault and perhaps on the application. Typically, an incompatible data set from the motion controller would be indicative of a failure of one of the position sensors. The requires a maintenance operation to debug, reset, and correct. A corrupt data set, on the other hand, is identified by a failed CRC. It requires a log in the event that it is occasional, but likewise a maintenance operation when it is frequent. So, some safety circuit faults just log and auto-reset (back to KILLED state), while other require maintenance to be reset.

A safety circuit fault is distinguished from a motion control fault, e.g. software position limit exceeded or a limit switch tripped expectedly for a given out-of-bounds position. The motion control fault results from a properly operating motion control system determining that motion is not within prescribed bounds. A "motion control fault" and subsequent response are defined by the design and configuration of the motion control system. Response by the motion controller can be controlled stopping, disabling feedback, or requesting drive power to be killed. This request can come through the serial data link, e.g. KILL motion control state, which is a "severe motion control fault" that it is a component which establishes condition Z in FIG. 3.

In the DISABLED state 32, drive power is active, but the motion controller is not yet ready for feedback control. The safety circuit stays in this state until one of the following occurs:
1) drive power is killed, a safety circuit fault is detected, or there is a severe motion control fault (Z, then it goes back to KILLED); or
2) there is any intrusion (V, then it goes to HALT); or
3) there is no intrusion and the motion control system is ready to servo (U, then it goes to ACTIVE).

This is determined when either condition Z, V, or U is true, where Z has priority over V and V has priority over U.

While in the ACTIVE state 33, the safety circuit continues to monitor all sensors and the motion control system for proper operation. The safety circuit stays in this state until one of the following occurs:
1) drive power is killed, a safety circuit fault is detected, or there is a severe motion control fault (Z, then it goes back to KILLED); or
2) there is any intrusion (V, then it goes to HALT); or
3) there is no intrusion and the motion control system is not ready to servo (W, then it goes to DISABLED).

This is determined when either condition Z, V, or W is true, where Z has priority over V and V has priority over W.

When going to the HALT state, the safety circuit takes over the motion control system causing all axes to stop. While in the HALT state 34, the safety circuit decides whether an existing intrusion incident is a Level 1 Intrusion. If it is, condition Q, then the safety circuit kills drive power and goes to the KILLED state. Also, in the HALT state, the safety circuit continues to monitor for follow-on or subsequent intrusion incidents that warrant similar scrutiny, and it makes sure the motion control system is in sync, properly recognizing the current state. While in this state, audio and visual warning can be supplied to alert the disinterested intruder, so he can get out of the way thereby permitting automatic recovery.

The safety circuit stays in the HALT state until one of the following occurs:
1) drive power is killed, a safety circuit fault is detected, or there is a severe motion control fault (Z, then back to KILLED); or
2) an intrusion incident becomes a Level 1 Intrusion (Q, then back to KILLED); or
3) the Level 2 Intrusion clears and the motion control system is not ready to servo (Y, then it goes to DISABLED); or
4) the Level 2 Intrusion clears and the motion control system is ready to servo (X, then it goes to ACTIVE). Note that the take-over test is a simulated Level 2 Intrusion incident. A change of state occurs here when either condition Q, Z, X, or Y is true, where Z and Q have priority over Y and Y has priority over X.

Figure 4:
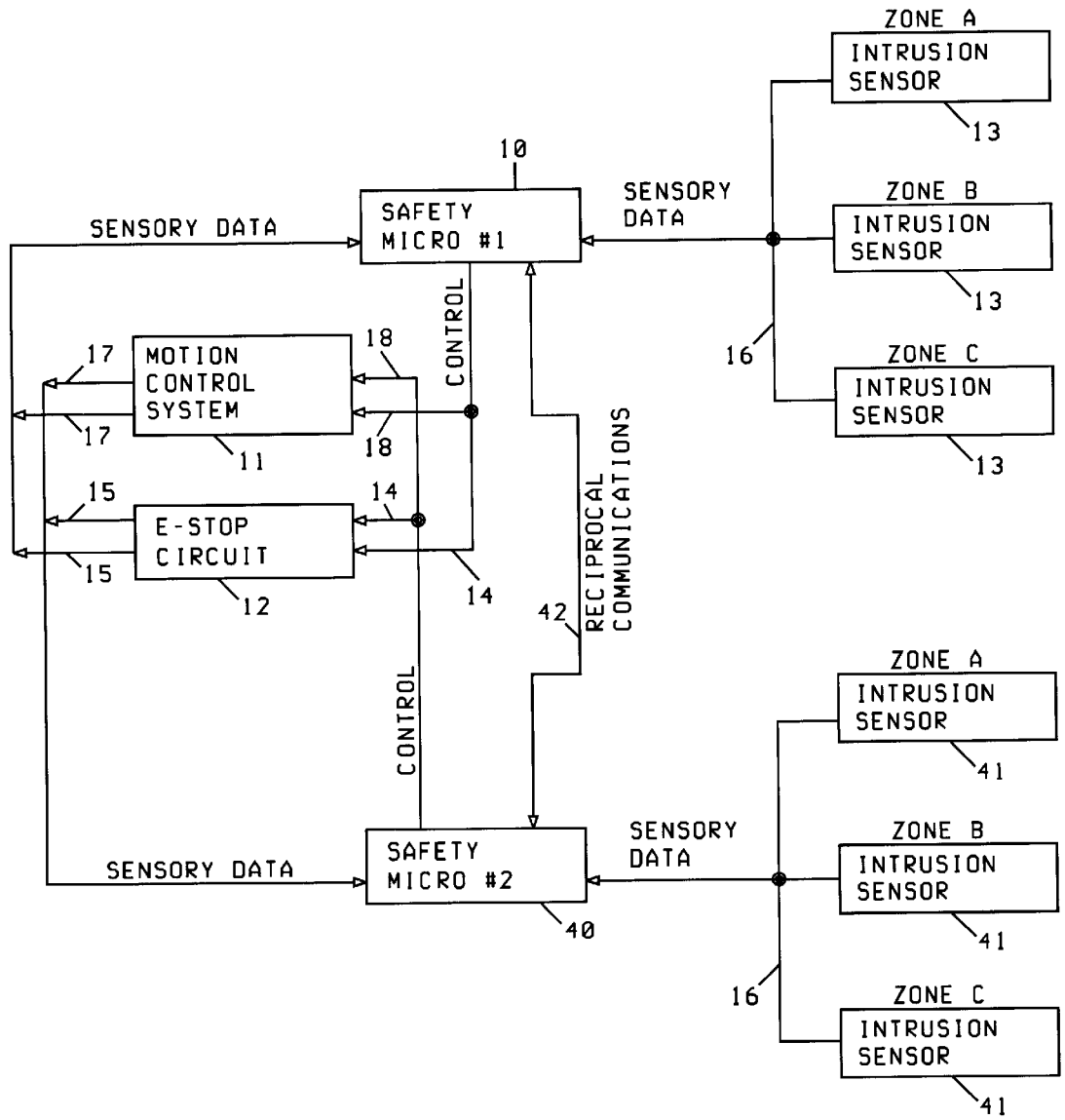
FIG. 4 depicts a schematic diagram of a reciprocal and redundant safety circuit.

FIG. 4 illustrates the typical application where multiple redundant safety micros 10 and 40 are used. Each has connections 17, 18, to the same motion control system 11 and 14, 15 to the same emergency stop circuit 12. Each has connections 16 to independent, redundant sensors 13, 41 that monitor identical zones. For example, the first sensor for each safety micro monitors the same area (called 'Zone A'). Typically, these two sensors will be of differing, diverse technology to help ensure that some environmental condition does not affect both adversely (e.g. if both were passive infrared, they might both be blind to black pants of an intruder).

The safety micros monitor each other via a serial communications link 42 and constantly compare what they see to make sure that the intrusion sensors work. They take turns testing each sensor to ensure reliability (so that one sensor is always active for a given zone). They also take turns periodically running take-over tests of the motion control system. Apparently, a safe safety circuit can be designed such that the communications between the motion controller and each safety micro 17, 18 and between the safety micros themselves 42 can be carried out over the same serial communications link in a round-robin, multi-master format. Obviously, up to three separate links can be employed, forming in the end a three-way bi-directional link, independent links between the motion controller and each safety micro and then a third between the two safety micros.

It should be understood that the examples and embodiments described herein are for illustrative purposes only and that various modifications or changes in light thereof will be suggested to persons skilled in the art and are to be included within the spirit and purview of this application.

What is claimed:

1. An electronic control system for machinery comprising:

a motion control system comprising means to effect controlled motion of each axis of said machinery, wherein said motion control system carries out the task of said machinery;

an emergency-stop circuit comprising means for controlling the flow of bulk power, wherein presence of said flow of bulk power empowers said motion control system to effect controlled motion for said each axis, wherein absence of said flow of bulk power prevents uncontrolled motion of said each axis, wherein said means for controlling said flow of bulk power is responsive to the command of an operator;

at least one hazard sensor, wherein each hazard sensor provides at least one hazard sensor value; and at least one safety circuit, wherein said safety circuit prevents hazardous situations, wherein said safety circuit receives from at least one of said at least one hazard sensor at least one of said at least one hazard sensor value;

wherein said safety circuit further comprises a risk assessment means that generates at least one hazard assessment, each of which is a sensed degree of hazard present for at least one of said at least one of said at least one hazard sensor value, wherein said risk assessment means further determines the most severe of said at least one hazard assessment which sets the hazard severity level for said safety circuit, whereby said hazard severity level is assigned one of at least three severity levels (a) hazard is not present,
   (b) hazard is present but not dangerous, or
   (c) hazard is dangerous; wherein said safety circuit further comprises (d) a first control means to variably restrict operation of said motion control system, (e) a second control means to stop or keep stopped said flow of bulk power by way of said emergency-stop circuit, wherein said second control means when activated overrides the command of an operator to start said flow of bulk power, and (f) a first sensing means to determine whether said bulk power flows or whether said emergency-stop circuit is energized, wherein said safety circuit further controls operation of said machinery in a plurality of operating states, wherein said operating states comprise unrestricted operation (ACTIVE), partially restricted operation (HALT), and totally restricted operation (KILLED), wherein said states qualify operation so that (g) said ACTIVE state does not restrict operation, (h) said HALT state restricts motion for each affected axis through said motion control system wherein said first control means is used, and (i) said KILLED state stops motion for each affected axis through said motion control system wherein said first control means is used and stops said flow of bulk power to said machinery through said emergency-stop circuit wherein said second control means is used and keeps stopped said flow of bulk power wherein said second control means is continuously used as long as said hazard severity level is hazard is dangerous, wherein said safety circuit further comprises a state machine means to maintain state or change state so that said safety circuit maintains (j) said KILLED state when said hazard severity level is hazard is dangerous, and otherwise transitions to (k) said KILLED state when power is first applied to logic of said electronic control system or when said first sensing means to sense said flow of bulk power determines said bulk power has stopped flowing or when said hazard severity level is hazard is dangerous, or (l) said HALT state when said hazard severity level is hazard is present but not dangerous and said bulk power flows as sensed by said first sensing means, or (m) said ACTIVE state when said hazard severity level is hazard is not present and said bulk power flows as sensed by said first sensing means.

2. The electronic control system of claim 1 wherein said plurality of operating states further comprises a standby (DISABLED) state, wherein said safety circuit further comprises (a) a second sensing means to determine whether said motion control system is ready to effect said controlled motion of each axis, wherein said states further qualify operation so that (b) said DISABLED state is a standby state, wherein said emergency-stop circuit is energized, wherein said bulk power flows, wherein said motion control system is not ready, wherein said state machine means further otherwise transitions to (c) said DISABLED state when said hazard severity level is hazard is not present, said bulk power is flowing as sensed by said first sensing means, and said second sensing means determines motion control system is not ready, or (d) said ACTIVE state when said hazard severity level is hazard is not present and said bulk power is flowing as sensed by said first sensing means, and said second sensing means determines motion control system is ready.

3. The electronic control system of claim 1 wherein said plurality of operating states further comprises an error (ERROR) state, wherein said safety circuit further comprises
   (a) a second sensing means to determine whether said electronic control system has a safety circuit fault that constitutes an error internal to said electronic control system, wherein said states further qualify operation so that
   (b) said ERROR state stops motion for each affected axis through said motion control system wherein said first control means is used and stops said flow of bulk power to the machinery through said emergency-stop circuit wherein said second control means is used and keeps stopped said flow of bulk power wherein said second control means is continuously used, wherein a given safety circuit fault is responsive to a request to clear by an operator, wherein said state machine means further otherwise transitions to
   (c) said KILLED state from said ERROR state when said second sensing means determines said safety circuit fault has cleared,
   (d) said ERROR state when said second sensing means determines said safety circuit fault is present.

4. The electronic control system of claim 1 wherein at least one of said at least one of said at least one hazard sensor is an intrusion sensor, wherein said intrusion sensor identifies a person or persons or foreign objects in the workspace of said machinery, wherein at least one of said at least one of said at least one hazard sensor value is a corresponding intrusion sensor signal, wherein the intensity of said intrusion sensor signal is indicative of the degree of intrusion, wherein at least one of said at least one hazard assessment is a corresponding degree of intrusion, wherein said risk assessment means assigns said degree of intrusion the severity level of hazard is dangerous in the case where said intensity exceeds a selected first threshold or exceeds a selected second threshold for a period exceeding a selected duration, wherein said second threshold is less than said first threshold, wherein otherwise said risk assessment means assigns said degree of intrusion the severity level of hazard is present but not dangerous in the case where said intensity exceeds a selected third threshold wherein said third threshold is less than said first threshold, wherein otherwise said risk assessment means assigns said degree of intrusion hazard is not present.

5. The electronic control system of claim 4 wherein said safety circuit comprises a second sensing means that determines whether any axis of said machinery is moving, wherein said risk assessment means temporarily replaces said first threshold, said second threshold, said third threshold, and said duration with a more restrictive set during the time said second sensing means determines movement occurs and replaces said more restrictive set with the original set when second sensing means determines that all axes of said machinery have stopped.

6. The electronic control system of claim 4, wherein said safety circuit further comprises intrusion sensor testing means to purposefully provide intrusion into the workspace of said machinery, wherein said intrusion focuses on intruding only into the field of view of a selected intrusion sensor, whereby said safety circuit tests the integrity of said selected intrusion sensor and said safety circuit by activating said intrusion sensor testing means, which constitutes an intrusion sensor test, whereby a corresponding intrusion sensor signal is expected to increase in intensity, whereby said risk assessment means is expected to set a corresponding degree of intrusion to hazard is dangerous, after which said intrusion sensor testing means is deactivated, whereby intrusion is removed from said selected intrusion sensor, whereby said intrusion sensor signal is expected to decrease in intensity, whereby said risk assessment means is expected to set said degree of intrusion to hazard is not present;

wherein the absence of a hazard is dangerous severity level for said degree of intrusion during said intrusion test when said intrusion sensor testing means is activated constitutes a safety circuit fault, wherein the absence of a hazard is not present severity level for said degree of intrusion after said intrusion sensor testing means has deactivated constitutes a safety circuit fault, wherein the presence of hazard is dangerous during said intrusion sensor test is ignored by said risk assessment means for determining said hazard severity level;

wherein said intrusion sensor testing means activates itself at selected intervals in selected states;

wherein said safety circuit further comprises
   (a) a second sensing means to determine whether said electronic control system has a safety circuit fault, wherein a safety circuit fault is an error internal to said electronic control system;

wherein said plurality of operating states further comprises an error (ERROR) state, wherein said states further qualify operation so that
   (b) said ERROR state stops motion for each affected axis through said motion control system wherein said first control means is used and stops said flow of bulk power to the machinery through said emergency-stop circuit wherein said second control means is used and keeps stopped said flow of bulk power wherein said second control means is continuously used, wherein a given safety circuit fault is responsive to a request to clear by an operator, wherein said state machine means further otherwise transitions to
   (c) said KILLED state from said ERROR state when said second sensing means determines said safety circuit fault has cleared,
   (d) said ERROR state when said second sensing means determines said safety circuit fault has occurred.

7. The electronic control system of claim 4, wherein safety circuit further comprises emitting means to emit a visual or audible signal when in the HALT state to alert an intruder that productivity is halted.

8. The electronic control system of claim 3, wherein said motion control system is further one of said at least one of said at least one hazard sensor, wherein said safety circuit receives motion control status from said motion control system, wherein said motion control status includes at least one element of all elements of any or all axes of said machinery, wherein elements comprise at least one of each of position, velocity, force, amplifier status, limit switch status, or axis status of any axis of said machinery, wherein position or velocity elements selectively comprise commanded and actual values, wherein amplifier status includes the command and actual amplifier control values together with whether the amplifier is enabled and whether amplifier is in fault, wherein axis status includes whether said motion control system has feedback on for axis and whether it is moving and whether it is initializing and whether an axis has a motion control fault, wherein motion control fault indicates an axis has invalid position, limit switch values, velocity, force, or amplifier control value, wherein said safety circuit further comprises memory means to store a priori bounds for some elements for selected axes of said machinery comprising position limits, velocity limits, force limits, or amplifier limits, wherein each limit identifies lower and upper bounds of an element for an axis of said machinery, wherein said bounds further comprise some additional elements for selected axes of said machinery including position error limits and velocity error limits, wherein said safety circuit further comprises identification means to identify with which axis of said machinery a given element corresponds, wherein said risk assessment means utilizes said identification means to segregate all elements of said motion control status so that elements can be grouped by each axis for said machinery, wherein each element of an axis for said machinery identifies the potential for hazard, wherein each utilized element of said motion control status is one of said at least one of said at least one hazard sensor value, wherein compatibility of all utilized elements of a given axis is indicative of the degree of reliable control of said given axis, wherein at least one of said at least one hazard assessment is the degree of reliable control of said given axis, whereby said risk assessment means evaluates the compatibility of all utilized elements of a given axis for said machinery that corresponds with a given hazard assessment in order to determine whether the set of all reported elements for said given axis are compatible with themselves and with corresponding said bounds, wherein said risk assessment means assigns said degree of reliable control of a given axis the severity level of hazard is dangerous in any case where (a) redundant position elements disagree, (b) an axis state does not report either a motion control fault or that axis is initializing in any of the cases when a corresponding position, velocity, force, or amplifier control value element is out-of-bounds or a difference between a commanded position and a corresponding actual position is out-of-bounds of a corresponding positional error limit or a difference between a commanded velocity and corresponding actual velocity is out-of-bounds of a corresponding velocity error limit, wherein said risk assessment means utilizes said memory means to determine whether element or difference in elements is out-of-bounds, (c) a position element changes value while a velocity element does not, (d) a position element changes value or a velocity element is non-zero while the corresponding axis state reports feedback off, (e) a position element changes value or a velocity element is non-zero or an axis state reports feedback on or axis is moving for a given axis when said state is HALT, (f) an amplifier status does not report amplifier fault or reports amplifier enabled in the case where an axis state is feedback off, or (g) an axis state does not report either a motion control fault or that axis is initializing in the case where a corresponding limit switch status reports a limit switch trips;

wherein otherwise risk assessment assigns said degree of reliable control of a given axis the severity level of hazard is not present; and wherein said first control means further restricts motion so that all axes of said machinery come to a full stop and are disabled while said flow of bulk power is maintained.

9. The electronic control system of claim 8 wherein said second sensing means further comprises means to retain the number of recent occurrences of a given hazard assessment, wherein repeated occurrences of said degree of reliable control of a given axis being assigned the severity level of hazard is dangerous is undesirable, wherein said second sensing means evaluates the number of said occurrences, wherein said second sensing means determines a said safety circuit fault occurs in the case when said number of said occurrences meets or exceeds a selected number where said selected number is greater than or equal to one.

10. The electronic control system of claim 9, wherein said safety circuit further comprises a bi-directional communications channel to receive said motion control status, whereupon said motion control system periodically sends said safety circuit data packets comprising said elements of said motion control status, wherein said first control means utilizes said bi-directional communications channel to send data packets to said motion control system to instruct said motion control system to discontinue control and halt motion for all axes of said machinery, wherein each said data packet includes a data integrity check, wherein each said data packet includes a timestamp, wherein said risk assessment means further assigns said degree of reliable control for a given axis the severity level of hazard is dangerous in the case where (a) data packet is missing as in the case when it does not arrive within a selected interval, (b) data integrity check fails, or (c) time stamp does not increment, wherein otherwise risk assessment assigns said degree of reliable control of a given axis the severity level of hazard is not present.

11. The electronic control system of 10, wherein said plurality of operating states further comprises a standby (DISABLED) state, wherein said safety circuit further comprises (a) a third sensing means to determine whether said motion control system is ready to effect said controlled motion of each axis, wherein said states further qualify operation so that (b) said DISABLED state is a standby state, wherein said emergency-stop circuit is energized, wherein said bulk power flows, wherein said motion control system is not ready, wherein said state machine means further otherwise transitions to (c) said DISABLED state when said hazard severity level is hazard is not present, said bulk power is flowing as sensed by said first sensing means, and said third sensing means determines motion control system is not ready, or (d) said ACTIVE state when said hazard severity level is hazard is not present and said bulk power is flowing as sensed by said first sensing means, and said third sensing means determines motion control system is ready;

wherein said motion control system utilizes said data packet to report whether said motion control system is ready to effect controlled motion, wherein said third sensing means utilizes said data packet to determine whether said motion control system is ready to effect said controlled motion of each axis.

12. The electronic control system of claim 9, wherein safety circuit further comprises motion control takeover testing means to verify the integrity of the effectiveness of said first control means to halt motion while retaining said flow of bulk power, wherein said motion control takeover testing means is activated periodically at selected intervals whenever said state machine is in said ACTIVE state, wherein activation of said motion control takeover testing means constitutes a takeover test, wherein activation of said motion control takeover testing means causes said state machine to transition into said HALT state, wherein said first control means is activated, whereby motion of all axes for said machinery is expected to stop, wherein elements of said motion control status for each axis are expected to indicate stoppage, disabling of feedback, and disabling of amplifier, wherein the absence during said takeover test of a said degree of reliable control of a given axis being assigned hazard is dangerous constitutes a safety circuit fault, wherein the presence during said takeover test of a said degree of reliable control of a given axis being assigned hazard is dangerous is ignored by said risk assessment means for determining said hazard severity level.

13. The electronic control system of claim 9 wherein at least one of said at least one of said at least one hazard sensor is an intrusion sensor, wherein said intrusion sensor identifies a person or persons or foreign objects in the workspace of said machinery, wherein at least one of said at least one of said at least one hazard sensor value is a corresponding intrusion sensor signal, wherein the intensity of said intrusion sensor signal is indicative of the degree of intrusion, wherein at least one of said at least one hazard assessment is a corresponding degree of intrusion, wherein said risk assessment means assigns said degree of intrusion the severity level of hazard is dangerous in the case where said intensity exceeds a selected first threshold or exceeds a selected second threshold for a period exceeding a selected duration, wherein said second threshold is less than said first threshold, wherein otherwise said risk assessment means assigns said degree of intrusion the severity level of hazard is present but not dangerous in the case where said intensity exceeds a selected third threshold wherein said third threshold is less than said first threshold, wherein otherwise said risk assessment means assigns said degree of intrusion hazard is not present.

14. The electronic control system of claim 13 wherein said safety circuit comprises a third sensing means that determines whether any axis of said machinery is moving, wherein said risk assessment means temporarily replaces said first threshold, said second threshold, said third threshold, and said duration with a more restrictive set during the time said third sensing means determines movement occurs and replaces said more restrictive set with the original set when third sensing means determines that all axes of said machinery have stopped; and wherein said safety circuit further comprises intrusion sensor testing means to purposefully provide intrusion into the workspace of said machinery, wherein said intrusion focuses on intruding only into the field of view of a selected intrusion sensor, whereby said safety circuit tests the integrity of said selected intrusion sensor and said safety circuit by activating said intrusion sensor testing means, which constitutes an intrusion sensor test, whereby a corresponding intrusion sensor signal is expected to increase in intensity, whereby said risk assessment means is expected to set a corresponding degree of intrusion to hazard is dangerous, after which said intrusion sensor testing means is deactivated, whereby intrusion is removed from said selected intrusion sensor, whereby said intrusion sensor signal is expected to decrease in intensity, whereby said risk assessment means is expected to set said degree of intrusion to hazard is not present;

wherein the absence of a hazard is dangerous severity level for said degree of intrusion during said intrusion test when said intrusion sensor testing means is activated constitutes a safety circuit fault, wherein the absence of a hazard is not present severity level for said degree of intrusion after said intrusion sensor testing means has deactivated constitutes a safety circuit fault, wherein the presence of hazard is dangerous during said intrusion sensor test is ignored by said risk assessment means for determining said hazard severity level; and wherein said intrusion sensor testing means activates itself at selected intervals in selected states.

15. The electronic control system of claim 14, wherein safety circuit further comprises motion control takeover testing means to verify the integrity of the effectiveness of said first control means to halt motion while retaining said flow of bulk power, wherein said motion control takeover testing means is activated periodically at selected intervals whenever said state machine is in said ACTIVE state, wherein activation of said motion control takeover testing means constitutes a takeover test, wherein activation of said motion control takeover testing means causes said state machine to transition into said HALT state, wherein said first control means is activated, whereby motion of all axes for said machinery is expected to stop, wherein elements of said motion control status for each axis are expected to indicate stoppage, disabling of feedback, and disabling of amplifier, wherein the absence during said takeover test of a said degree of reliable control of a given axis being assigned hazard is dangerous constitutes a safety circuit fault, wherein the presence during said takeover test of a said degree of reliable control of a given axis being assigned hazard is dangerous is ignored by said risk assessment means for determining said hazard severity level.

16. The electronic control system of claim 15, wherein said safety circuit further comprises a bi-directional communications channel to receive said motion control status, whereupon said motion control system periodically sends said safety circuit data packets comprising said elements of said motion control status, wherein said first control means utilizes said bi-directional communications channel to send data packets to said motion control system to instruct said motion control system to discontinue control and halt motion for all axes of said machinery, wherein each said data packet includes a data integrity check, wherein each said data packet includes a timestamp, wherein said risk assessment means further assigns said degree of reliable control for a given axis the severity level of hazard is dangerous in the case where (a) data packet is missing as in the case when it does not arrive within a selected interval, (b) data integrity check fails, or (c) time stamp does not increment, wherein otherwise risk assessment assigns said degree of reliable control of a given axis the severity level of hazard is not present;

wherein said plurality of operating states further comprises a standby (DISABLED) state, wherein said safety circuit further comprises (d) a fourth sensing means to determine whether said motion control system is ready to effect said controlled motion of each axis, wherein said states further qualify operation so that (e) said DISABLED state is a standby state, wherein said emergency-stop circuit is energized, wherein said bulk power flows, wherein said motion control system is not ready, wherein said state machine means further otherwise transitions to (f) said DISABLED state when said hazard severity level is hazard is not present, said bulk power is flowing as sensed by said first sensing means, and said fourth sensing means determines motion control system is not ready, or (g) said ACTIVE state when said hazard severity level is hazard is not present and said bulk power is flowing as sensed by said first sensing means, and said fourth sensing means determines motion control system is ready;

wherein said motion control system utilizes said data packet to report whether said motion control system is ready to effect controlled motion, wherein said fourth sensing means utilizes said data packet to determine whether said motion control system is ready to effect said controlled motion of each axis.

17. The electronic control system of claim 1 comprising at least two safety circuits, wherein each safety circuit further comprises means to report to the others said hazard severity level, wherein said state machine means of a given safety circuit utilizes a known transition to a KILLED state in another safety circuit to effect the same transition, whereby each safety circuit comprises a redundant means to stop said flow of bulk power.

18. A safety circuit for machinery for preventing hazardous situations comprising:

connections to a motion control system of said machinery, wherein said motion control system comprises means to effect controlled motion of each axis of said machinery, wherein said motion control system carries out the task of said machinery;

connections to an emergency-stop circuit of said machinery, wherein said emergency-stop circuit comprises means for controlling the flow of bulk power, wherein presence of said flow of bulk power empowers said motion control system to effect controlled motion for said each axis, wherein absence of said flow of bulk power prevents uncontrolled motion of said each axis, wherein said means for controlling said flow of bulk power is responsive to the command of an operator;

connections to at least one hazard sensor, wherein each hazard sensor provides at least one hazard sensor value;

wherein said safety circuit receives from at least one of said at least one hazard sensor at least one of said at least one hazard sensor value;

wherein said safety circuit further comprises a risk assessment means that generates at least one hazard assessment, each of which is a sensed degree of hazard present for at least one of said at least one of said at least one hazard sensor value, wherein said risk assessment means further determines the most severe of said at least one hazard assessment which sets the hazard severity level for said safety circuit, whereby said hazard severity level is assigned one of at least three severity levels (a) hazard is not present,
(b) hazard is present but not dangerous, or
(c) hazard is dangerous; wherein said safety circuit further comprises (d) a first control means to variably restrict operation of said motion control system, (e) a second control means to stop or keep stopped said flow of bulk power by way of said emergency-stop circuit, wherein said second control means when activated overrides the command of an operator to start said flow of bulk power, and (f) a first sensing means to determine whether said bulk power flows or whether said emergency-stop circuit is energized, wherein said safety circuit further controls operation of said machinery in a plurality of operating states, wherein said operating states comprise unrestricted operation (ACTIVE), partially restricted operation (HALT), and totally restricted operation (KILLED), wherein said states qualify operation so that (g) said ACTIVE state does not restrict operation, (h) said HALT state restricts motion for each affected axis through said motion control system wherein said first control means is used, and (i) said KILLED state stops motion for each affected axis through said motion control system wherein said first control means is used and stops said flow of bulk power to said machinery through said emergency-stop circuit wherein said second control means is used and keeps stopped said flow of bulk power wherein said second control means is continuously used as long as said hazard severity level is hazard is dangerous, wherein said safety circuit further comprises a state machine means to maintain state or change state so that said safety circuit maintains (j) said KILLED state when said hazard severity level is hazard is dangerous, and otherwise transitions to (k) said KILLED state when power is first applied to logic of said safety circuit or when said first sensing means to sense said flow of bulk power determines said bulk power has stopped flowing or when said hazard severity level is hazard is dangerous, or (l) said HALT state when said hazard severity level is hazard is present but not dangerous and said bulk power flows as sensed by said first sensing means, or (m) said ACTIVE state when said hazard severity level is hazard is not present and said bulk power flows as sensed by said first sensing means.

19. The safety circuit of claim 18 wherein said plurality of operating states further comprises an error (ERROR) state, wherein said safety circuit further comprises (a) a second sensing means to determine whether said safety circuit, said motion control circuit, or said hazard sensor has a safety circuit fault that constitutes an error internal to said machinery, wherein said states further qualify operation so that (b) said ERROR state stops motion for each affected axis through said motion control system wherein said first control means is used and stops said flow of bulk power to the machinery through said emergency-stop circuit wherein said second control means is used and keeps stopped said flow of bulk power wherein said second control means is continuously used, wherein a given safety circuit fault is responsive to a request to clear by an operator, wherein said state machine means further otherwise transitions to (c) said KILLED state from said ERROR state when said second sensing means determines said safety circuit fault has cleared, (d) said ERROR state when said second sensing means determines said safety circuit fault is present.

20. The safety circuit of claim 19 wherein at least one of said at least one of said at least one hazard sensor is an intrusion sensor, wherein said intrusion sensor identifies a person or persons or foreign objects in the workspace of said machinery, wherein at least one of said at least one of said at least one hazard sensor value is a corresponding intrusion sensor signal, wherein the intensity of said intrusion sensor signal is indicative of the degree of intrusion, wherein at least one of said at least one hazard assessment is a corresponding degree of intrusion, wherein said risk assessment means assigns said degree of intrusion the severity level of hazard is dangerous in the case where said intensity exceeds a selected first threshold or exceeds a selected second threshold for a period exceeding a selected duration, wherein said second threshold is less than said first threshold, wherein otherwise said risk assessment means assigns said degree of intrusion the severity level of hazard is present but not dangerous in the case where said intensity exceeds a selected third threshold wherein said third threshold is less than said first threshold, wherein otherwise said risk assessment means assigns said degree of intrusion hazard is not present; and wherein said safety circuit further comprises emitting means to emit a visual or audible signal when in the HALT state to alert an intruder that productivity is halted.

21. The safety circuit of claim 20 wherein said safety circuit comprises a third sensing means that determines whether any axis of said machinery is moving, wherein said risk assessment means temporarily replaces said first threshold, said second threshold, said third threshold, and said duration with a more restrictive set during the time said third sensing means determines movement occurs and replaces said more restrictive set with the original set when third sensing means determines that all axes of said machinery have stopped;

wherein said safety circuit further comprises intrusion sensor testing means to purposefully provide intrusion into the workspace of said machinery, wherein said intrusion focuses on intruding only into the field of view of a selected intrusion sensor, whereby said safety circuit tests the integrity of said selected intrusion sensor and said safety circuit by activating said intrusion sensor testing means, which constitutes an intrusion sensor test, whereby a corresponding intrusion sensor signal is expected to increase in intensity, whereby said risk assessment means is expected to set a corresponding degree of intrusion to hazard is dangerous, after which said intrusion sensor testing means is deactivated, whereby intrusion is removed from said selected intrusion sensor, whereby said intrusion sensor signal is expected to decrease in intensity, whereby said risk assessment means is expected to set said degree of intrusion to hazard is not present;

wherein the absence of a hazard is dangerous severity level for said degree of intrusion during said intrusion test when said intrusion sensor testing means is activated constitutes a safety circuit fault, wherein the absence of a hazard is not present severity level for said degree of intrusion after said intrusion sensor testing means has deactivated constitutes a safety circuit fault, wherein the presence of hazard is dangerous during said intrusion sensor test is ignored by said risk assessment means for determining said hazard severity level;

wherein said intrusion sensor testing means activates itself at selected intervals in selected states.

22. The safety circuit of claim 21, wherein said motion control system is further one of said at least one of said at least one hazard sensor, wherein said safety circuit receives motion control status from said motion control system, wherein said motion control status includes at least one element of all elements of any or all axes of said machinery, wherein elements comprise at least one of each of position, velocity, force, amplifier status, limit switch status, or axis status of any axis of said machinery, wherein position or velocity elements selectively comprise commanded and actual values, wherein amplifier status includes the command and actual amplifier control values together with whether the amplifier is enabled and whether amplifier is in fault, wherein axis status includes whether said motion control system has feedback on for axis and whether it is moving and whether it is initializing and whether an axis has a motion control fault, wherein motion control fault indicates an axis has invalid position, limit switch values, velocity, force, or amplifier control value, wherein said safety circuit further comprises memory means to store a priori bounds for some elements for selected axes of said machinery comprising position limits, velocity limits, force limits, or amplifier limits, wherein each limit identifies lower and upper bounds of an element for an axis of said machinery, wherein said bounds further comprise some additional elements for selected axes of said machinery including position error limits and velocity error limits, wherein said safety circuit further comprises identification means to identify with which axis of said machinery a given element corresponds, wherein said risk assessment means utilizes said identification means to segregate all elements of said motion control status so that elements can be grouped by each axis for said machinery, wherein each element of an axis for said machinery identifies the potential for hazard, wherein each utilized element of said motion control status is one of said at least one of said at least one hazard sensor value, wherein compatibility of all utilized elements of a given axis is indicative of the degree of reliable control of said given axis, wherein at least one of said at least one hazard assessment is the degree of reliable control of said given axis, whereby said risk assessment means evaluates the compatibility of all utilized elements of a given axis for said machinery that corresponds with a given hazard assessment in order to determine whether the set of all reported elements for said given axis are compatible with themselves and with corresponding said bounds, wherein said risk assessment means assigns said degree of reliable control of a given axis the severity level of hazard is dangerous in any case where (a) redundant position elements disagree, (b) an axis state does not report either a motion control fault or that axis is initializing in any of the cases when a corresponding position, velocity, force, or amplifier control value element is out-of-bounds or a difference between a commanded position and a corresponding actual position is out-of-bounds of a corresponding positional error limit or a difference between a commanded velocity and corresponding actual velocity is out-of-bounds of a corresponding velocity error limit, wherein said risk assessment means utilizes said memory means to determine whether element or difference in elements is out-of-bounds, (c) a position element changes value while a velocity element does not, (d) a position element changes value or a velocity element is non-zero while the corresponding axis state reports feedback off, (e) a position element changes value or a velocity element is non-zero or an axis state reports feedback on or axis is moving for a given axis when said state is HALT, (f) an amplifier status does not report amplifier fault or reports amplifier enabled in the case where an axis state is feedback off, or (g) an axis state does not report either a motion control fault or that axis is initializing in the case where a corresponding limit switch status reports a limit switch trips;

wherein otherwise risk assessment assigns said degree of reliable control of a given axis the severity level of hazard is not present;

wherein said first means further restricts motion so that all axes of said machinery come to a full stop and are disabled while said flow of bulk power is maintained; and wherein said second sensing means further comprises means to retain the number of recent occurrences of a given hazard assessment, wherein repeated occurrences of said degree of reliable control of a given axis being assigned the severity level of hazard is dangerous is undesirable, wherein said second sensing means evaluates the number of said occurrences, wherein said second sensing means determines a said safety circuit fault occurs in the case when said number of said occurrences meets or exceeds a selected number where said selected number is greater than or equal to one.

23. The safety circuit of claim 22, wherein safety circuit further comprises motion control takeover testing means to verify the integrity of the effectiveness of said first control means to halt motion while retaining said flow of bulk power, wherein said motion control takeover testing means is activated periodically at selected intervals whenever said state machine is in said ACTIVE state, wherein activation of said motion control takeover testing means constitutes a takeover test, wherein activation of said motion control takeover testing means causes said state machine to transition into said HALT state, wherein said first control means is activated, whereby motion of all axes for said machinery is expected to stop, wherein elements of said motion control status for each axis are expected to indicate stoppage, disabling of feedback, and disabling of amplifier, wherein the absence during said takeover test of a said degree of reliable control of a given axis being assigned hazard is dangerous constitutes a safety circuit fault, wherein the presence during said takeover test of a said degree of reliable control of a given axis being assigned hazard is dangerous is ignored by said risk assessment means for determining said hazard severity level.

24. The safety circuit of claim 23, wherein said safety circuit further comprises a bi-directional communications channel to receive said motion control status, whereupon said motion control system periodically sends said safety circuit data packets comprising said elements of said motion control status, wherein said first control means utilizes said bi-directional communications channel to send data packets to said motion control system to instruct said motion control system to discontinue control and halt motion for all axes of said machinery, wherein each said data packet includes a data integrity check, wherein each said data packet includes a timestamp, wherein said risk assessment means further assigns said degree of reliable control for a given axis the severity level of hazard is dangerous in the case where (a) data packet is missing as in the case when it does not arrive within a selected interval, (b) data integrity check fails, or (c) time stamp does not increment, wherein otherwise risk assessment assigns said degree of reliable control of a given axis the severity level of hazard is not present; and wherein said plurality of operating states further comprises a standby (DISABLED) state, wherein said safety circuit further comprises (d) a fourth sensing means to determine whether said motion control system is ready to effect said controlled motion of each axis, wherein said states further qualify operation so that (e) said DISABLED state is a standby state, wherein said emergency-stop circuit is energized, wherein said bulk power flows, wherein said motion control system is not ready, wherein said state machine means further otherwise transitions to (f) said DISABLED state when said hazard severity level is hazard is not present, said bulk power is flowing as sensed by said first sensing means, and said fourth sensing means determines motion control system is not ready, or (g) said ACTIVE state when said hazard severity level is hazard is not present and said bulk power is flowing as sensed by said first sensing means, and said fourth sensing means determines motion control system is ready;

wherein said motion control system utilizes said data packet to report whether said motion control system is ready to effect controlled motion, wherein said fourth sensing means utilizes said data packet to determine whether said motion control system is ready to effect said controlled motion of each axis.

25. A method for preventing hazardous situations in machinery wherein at least one hazard sensor is used, wherein each hazard sensor reports at least one hazard sensor value that identifies a potential for hazard, wherein a risk assessment means is used that (1) conducts at least one hazard assessment for the hazard sensor values provided by the hazard sensors, (2) generates a hazard severity level from the said at least one hazard assessment, which identifies said hazard severity level as the most severe hazard assessment, and (3) assigns said hazard severity level one of
(a) hazard is not present,
(b) hazard is present but not dangerous, or
(c) hazard is dangerous, wherein a motion control system is used comprising means to effect controlled motion of each axis of said machinery, wherein said motion control system carries out the task of said machinery, wherein an emergency-stop circuit is used comprising means for controlling the flow of bulk power, wherein presence of said flow of bulk power empowers said motion control system to effect controlled motion for said each axis, wherein absence of said flow of bulk power prevents uncontrolled motion of said each axis, wherein said means for controlling said flow of bulk power is responsive to the command of an operator, wherein a first control means is used to variably restrict operation of said motion control system, wherein a second control means is to stop or keep stopped said flow of bulk power by way of said emergency-stop circuit, wherein said second control means when activated overrides the command of an operator to start said flow of bulk power, wherein a first sensing means is used to determine whether said bulk power flows or whether said emergency-stop circuit is energized, wherein said method utilizes various operating states to define said method, wherein said operating states comprise unrestricted operation (ACTIVE), partially restricted operation (HALT), and totally restricted operation (KILLED), wherein said operating states qualify operation so that
  (a) said ACTIVE state does not restrict operation,
  (b) said HALT state restricts motion for each affected axis through said motion control system wherein said first control means is used, and
  (c) said KILLED state stops motion for each affected axis through said motion control system wherein said first control means is used and stops said flow of bulk power to said machinery through said emergency-stop circuit wherein said second control means is used and keeps stopped said flow of bulk power wherein said second control means is continuously used as long as said hazard severity level is hazard is dangerous, wherein said method comprises the steps of:
1) Start in the KILLED state,
2) Use risk assessment means to conduct a hazard assessment for the hazard sensor values, find the most severe hazard assessment, and assign the hazard severity level,
3) If hazard severity level is hazard is dangerous, then
  (a) use second control means,
  (b) stay in the KILLED state, and
  (c) go back to step 2,
4) If hazard severity level is hazard is present but not dangerous present and first sensing means determines said bulk power flows, then
  (a) use first control means,
  (b) transition to HALT state, and
  (c) go to step 10,
5) If hazard severity level is hazard is not present and first sensing means determines said bulk power flows, then
  (a) transition into ACTIVE state, and
  (b) go to step 6,
6) In ACTIVE state, repeat step 2 here,
7) If hazard severity level is hazard is dangerous or said first sensing means determines said bulk power has stopped flowing, then
  (a) use both first and second control means,
  (b) transition into the KILLED state, and
  (c) go back to step 2,
8) If hazard severity level is hazard is present but not dangerous, then
  (a) use first control means,
  (b) transition to HALT state, and
  (c) go to step 10,
9) Otherwise stay in ACTIVE state and go back to step 6,
10) In HALT state, repeat step 2 here,
11) Do step 7 here,
12) Otherwise, do step 5 here, and
13) Otherwise, continue first control means and return to step 10.

26. The method for preventing hazardous situations in machinery in claim 25, wherein a safety circuit fault indicates the reliability of some component of said machinery is uncertain which therefore creates a hazardous situation, wherein a second sensing means is used to determine whether a safety circuit fault exists, wherein a safety circuit fault requires inspection of said machinery to determine whether all components are functioning properly, wherein an additional operating state is added comprising the error (ERROR) state, wherein said ERROR state further qualifies operation so that said ERROR state stops motion for each affected axis through said motion control system wherein said first control means is used and stops said flow of bulk power to the machinery through said emergency-stop circuit wherein said second control means is used and keeps stopped said flow of bulk power wherein said second control means is continuously used, wherein said ERROR state is a safe state for an operator to inspect said machinery, wherein a given safety circuit fault is responsive to a request to clear by an operator, wherein step 3 of said method is changed to
3) If second sensing means determines there is a safety circuit fault, then
  (a) use both first and second control means,
  (b) transition into the ERROR state, and
  (c) go to step 14,
  else if hazard severity level is hazard is dangerous, then
  (a) use second control means,
  (b) stay in the KILLED state, and
  (c) go back to step 2,
where step 7 is likewise replaced by
7) If second sensing means determines there is a safety circuit fault, then
  (a) use both first and second control means,
  (b) transition into the ERROR state, and
  (c) go to step 14,
  else if hazard severity level is hazard is dangerous or said first sensing means determines said bulk power has stopped flowing, then
  (a) use both first and second control means,
  (b) transition into the KILLED state, and
  (c) go back to step 2,
where the steps are added,
14) In ERROR state, do step 2 here,
15) If operator clears said safety circuit fault or if said second sensing means determines that the safety circuit fault no longer exists, then go back to step 2.

27. The method for preventing hazardous situations in machinery in claim 26, wherein at least one hazard sensor is an intrusion sensor, wherein a corresponding intrusion sensor signal is a hazard sensor value, wherein the intrusion sensor value provides a degree of intrusion in the case where a person or persons or foreign objects enter the workspace of said machinery, wherein a hazard assessment corresponds with the degree of intrusion, wherein said risk assessment assigns a corresponding hazard assessment a severity level of (a) hazard is not present, (b) hazard is present but not dangerous, and (c) hazard is dangerous, wherein said risk assessment means utilizes said corresponding hazard assessment with all hazard assessments to determine the most severe hazard assessment which thereby sets said hazard severity level, wherein periodic testing of said intrusion sensor is desirable so that said method may rely on the degree of intrusion it reports, wherein said periodic testing comprises purposefully activating intrusion into the workspace of said machinery in such a way that focuses said intrusion only into the field of view of a selected intrusion sensor being tested, wherein such periodic testing is an intrusion sensor test, wherein said periodic testing may commence in any step of said method, wherein success of said intrusion sensor test is quantified by a corresponding degree of intrusion being assigned hazard is dangerous during said intrusion sensor test and being re-assigned hazard is not present at the conclusion of said intrusion sensor test, wherein otherwise failure of said intrusion sensor test results in a safety circuit fault, wherein said risk assessment ignores a corresponding hazard assessment during the period of said intrusion sensor test, and wherein said second sensing means is responsive to failure of said intrusion sensor test.

28. The method for preventing hazardous situations in machinery in claim 27, wherein one of the hazard sensors is the motion control system, wherein data provided by said motion control system comprise hazard sensor values, wherein said data are indicative of the degree of reliability of control, wherein unreliable control creates a hazardous situation, wherein said risk assessment conducts a hazard assessment on the data provided by said motion control system, wherein said risk assessment assigns the corresponding hazard assessment a severity level of (a) hazard is not present, (b) hazard is present but not dangerous, and (c) hazard is dangerous, wherein said risk assessment means utilizes said corresponding hazard assessment with all hazard assessments to determine the most severe hazard assessment which thereby sets said hazard severity level, wherein hazard assessments, corresponding to said data provided by said motion control system, being frequently assigned severity levels differing from hazard is not present is undesirable, wherein said second sensing means further keeps track of the number of occurrences of corresponding hazard assessments having a severity level differing from hazard is not present, wherein said second sensing means declares a safety circuit fault in the case when number of such occurrences equals or exceeds a selected number, wherein said first control means further restricts said motion control system so that all axes of said machinery come to full stop and disable while said flow of bulk power continues, wherein it is most desirable to conduct reliable motion control in said HALT state in which said first control means is employed in which said hazard severity level is hazard is present but not dangerous, wherein periodic testing of the reliability of said motion control system is desirable in this regard, wherein such periodic testing consists of a simulated hazard assessment assigned the severity level of hazard is present but dangerous being periodically used in step 6 of said method, wherein said simulated hazard assessment results in said method proceeding to step 10 in absence of other more severe hazard assessments, wherein such periodic testing is a takeover test, wherein a successful takeover test is quantified by said data provided by said motion control identifying the full stop and disabling of all axes of said machinery, wherein otherwise failure constitutes a safety circuit fault, wherein said risk assessment ignores a corresponding hazard assessment during the period of said takeover test, and wherein said second sensing means is responsive to failure of said takeover test.

* * * * *